(12) United States Patent  (10) Patent No.: US 7,795,754 B2
Ho et al.  (45) Date of Patent: Sep. 14, 2010

(54) SLOPE CONTROL DEVICE CAPABLE OF PREDICTING UNIFORM-CURRENT-SHARING LEVEL AND METHOD THEREOF

(75) Inventors: Hsin-Hsin Ho, Taipei County (TW); Ke-Horng Chen, Taipei County (TW); Chun-Yu Hsieh, Taichung (TW)

(73) Assignee: National Chiao Tung University, Hsinchu (TW)

( * ) Notice: Subject to any disclaimer, the term of this patent is extended or adjusted under 35 U.S.C. 154(b) by 353 days.

(21) Appl. No.: 12/071,956

(22) Filed: Feb. 28, 2008

(65) Prior Publication Data

US 2009/0218885 A1     Sep. 3, 2009

(51) Int. Cl.
*H02J 3/46* (2006.01)
(52) U.S. Cl. .......................................... 307/52; 307/53
(58) Field of Classification Search .............. 307/52–63
See application file for complete search history.

(56) References Cited

U.S. PATENT DOCUMENTS

| | | | | |
|---|---|---|---|---|
| 4,468,722 A | * | 8/1984 | Kammiller | 307/44 |
| 4,635,178 A | * | 1/1987 | Greenhalgh | 307/58 |
| 4,827,391 A | * | 5/1989 | Sills | 363/41 |
| 5,521,809 A | * | 5/1996 | Ashley et al. | 307/82 |
| 7,170,765 B2 | * | 1/2007 | Huang | 307/82 |

* cited by examiner

*Primary Examiner*—Fritz M Fleming
(74) *Attorney, Agent, or Firm*—Bacon & Thomas, PLLC (57) ABSTRACT

The present invention discloses a slope control device capable of predicting uniform-current-sharing level and method thereof which can be applied in a redundancy or distributed power system for providing better uniform-current-sharing ability. The device comprises a high linearity transconductor circuit, a slope adjusting circuit and an incremental output voltage circuit. The invention applies either a transconductor parameter or a feedback resistor to increase the droop gain and therefore the current deviation between two power supply modules is reduced. The invention further raises the output voltage step by step to ensure that the output voltage meet the requirement of allowable minimum output voltage according to increment of load current.

13 Claims, 7 Drawing Sheets

SLOPE CONTROL DEVICE CAPABLE OF PREDICTING UNIFORM-CURRENT-SHARING LEVEL AND METHOD THEREOF

BACKGROUND OF THE INVENTION (a) Field of the Invention

The invention is related to a slope control device and method thereof, in particularly to a slope control device capable of predicting uniform-current-sharing level and method thereof applied in a distributed power system.

(b) Description of the Prior Art

Recently, the distributed power system is increasingly applied in the communication system and the computer server. The distributed power system comprises several small capability power modules which are connected in parallel for supplying the power to the load. Compared to the central power system, the distributed power system has several advantages, including:

1. Capability of using modulized power source: When the central power system is used for supplying power, it will take much effort to redesign the power system if the customer changes the power requirement. However, because of modulized design of the distributed power system, the user can adjust the number of parallel connected power modules to keep up with the increasing load current requirement. Besides, when one of power modules of the distributed power system is shortened or breakdown, the faulty modules can be exchanged without system interruption.

2. Capability of reducing the current stress in single power module: The distributed power system can averagely distribute the output current to the paralleled power modules. Therefore, the current stress in each module can be reduced and hence the efficiency and volume of the distributed power system can be improved. In other word, the single power module can be implemented by the power units with lower rated voltage and current.

3. Efficient heat management: Generally speaking, the life time of the electronic elements reduces half when the temperature of the junctions in the electronic elements increases 10° C. The parallel connected power system ensures equal distribution of the output current and further results in uniform decentralized heat dissipation. By equally delivering the power dissipation among a large number of power components and over a greater surface area, thermal management is effectively achieved and the reliability of the system is greatly improved.

4. Capability of implementing redundancy circuit architecture: The distributed power system is easy to achieve the redundancy circuit structure in which N+1 power modules are connected in parallel. In redundant systems, one power module is at least reserved and it provides extra output load current. The benefits of such structure include reducing total power dissipation and improving the maintainability when the failure occurs. In other words, the redundancy circuit structure is very robust and is suitable for important servers or apparatus.

Currently, there are two methods applied on the distributed power system for distributing the current averagely. One is the droop method and the other is the active current-sharing method. The major difference between the droop method and the active current-sharing method is that the paralleled power modules applied the latter method need extra pinouts. These pinouts are used for enabling current sharing control circuits of paralleled power modules to communicate the information of each output current. The average current information is carried between the modules by these pinouts and hence these are so called as current-sharing bus, abbreviated CS bus. The CS bus provides a common reference to the paralleled power modules, and hence each module adjusts its output current based on the common reference. However, the droop method does not require the average current information and therefore it needs no interconnection between modules.

In conclusion, the benefits of the droop method are simple design, easy extension, needless extra connection between power modules, high modulability and high reliability. The benefits of the active current-sharing method are better load adjustability and better uniform-current-sharing ability.

Figure 1:
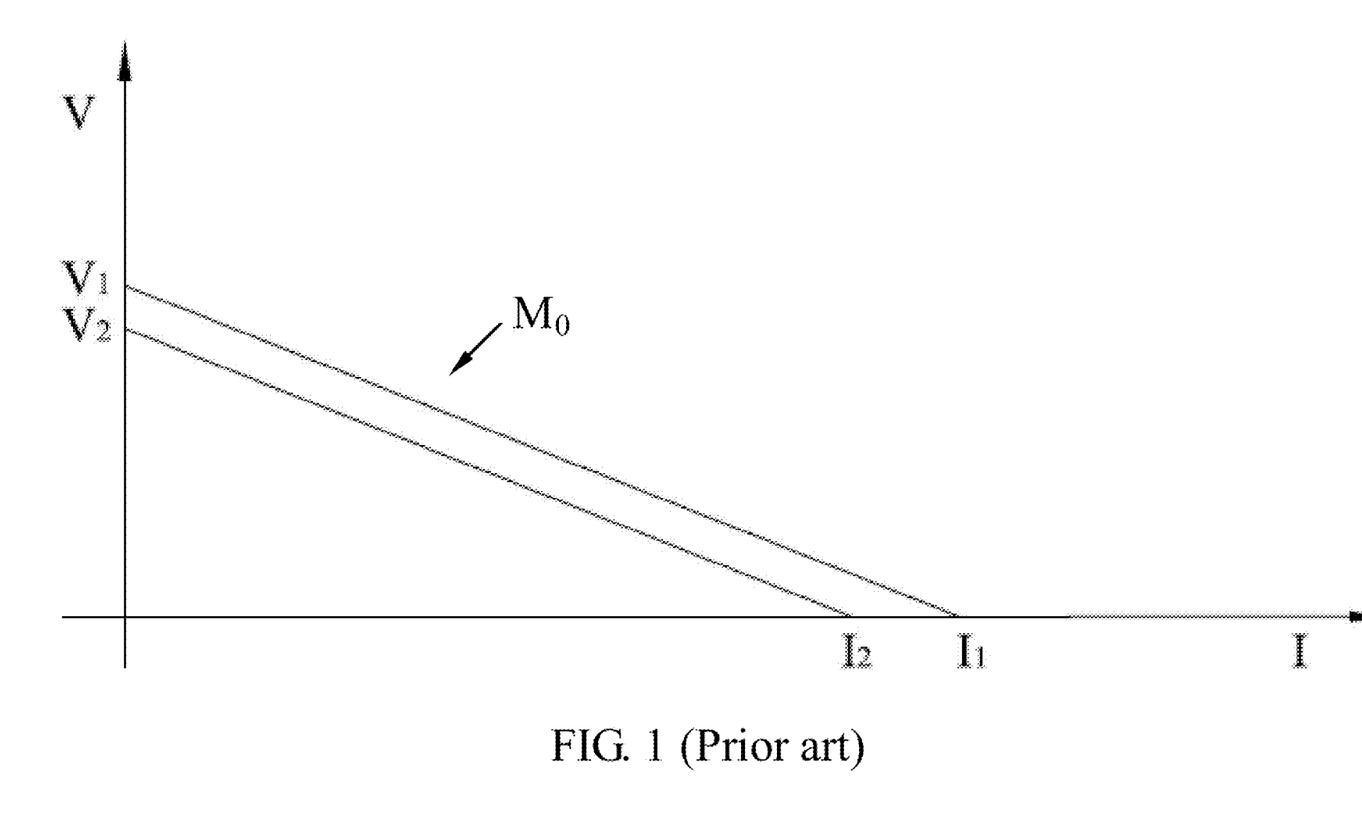
FIG. 1 is the sketch map of the output voltage and the output current of the prior.

FIG. 1 illustrates a schematic view of the output voltage and the output current of the droop method in accordance with the prior art. When applying the droop method on the distributed power system, the output voltage drops as the load current increases. The current sharing mechanism of this method relies on the slope of the load regulation characteristic of the parallel connected modules. In FIG. 1, even if the output voltage-current slopes of two different modules are the same, the current I1 and the current I2 differs from each other since there is minor difference between the elements of the power modules such as the reference voltage at no load condition.

As illustrated in FIG. 1, the distribution of current is more uniform when the difference between the reference voltages at no load condition is smaller. Besides, even if the difference of each reference voltage is the same, raise of the output voltage-current slopes is also contributive to improve the current derivation between two power supply modules. However, owing to the trade-off between error percentages of current sharing and output voltage variation, conventional droop technique can not provide good load regulation and current balance at the same time. The slope of the traditional droop method is limited by the maximum output voltage variation specification, and can not be raised as high as expected.

In view of the drawbacks of the prior art, the inventor of the present invention based on years of experience in the related industry to conduct extensive researches and experiments, and finally developed a slope control device capable of predicting uniform-current-sharing level and method thereof in accordance with the present invention to overcome the aforementioned drawbacks.

SUMMARY OF THE INVENTION

Therefore, it is one of objective of the present invention to provide a slope control device capable of predicting uniform-current-sharing level and method thereof to overcome the poor uniform-current-sharing ability of the droop method in accordance with the prior art.

Based on the objective of the present invention, a slope control device capable of predicting uniform-current-sharing level is provided. The slope control device is applied for a power system operated with the droop method. The slope control device comprises a high linearity transconductor, a slope adjusting circuit and an incremental output voltage circuit. The output current of the power system is passed through a sample resistor for generating a detection voltage. The transconductor transforms the detection voltage into a detection current, and send it to the slope adjusting circuit and incremental output voltage circuit.

The slope adjusting circuit adjusts the slope of the load regulation characteristic of the parallel connected modules based on the information of the detection current. The incremental output voltage circuit raises the output voltage step by step based on the information of the detection current and compensated the extra output dropout voltage automatically according to the steeper slope value of the novel method.

The present invention provides a slope control method capable of predicting uniform-current-sharing level for decreasing the difference between the output currents supplied by a plurality of power modules. First, an output voltage and an output current are obtained from the power module for calculation of an original slope. Then, a sample register is used to generate a detection voltage from the output current, and uses a high linearity transconductor to transform the detection voltage into the detection current. Then a feedback resistor and the detection current are used to adjust the original slope. Finally, the method raises the output voltage step by step based on the adjusted slope to ensure that the output voltage is located at the tolerable range of the system.

As mentioned above, the slope control device capable of predicting uniform-current-sharing level and method in accordance with the present invention can keep the output voltage in the tolerable range of the system and decreases the difference of the output currents by increasing the slope, and therefore enhance the average-current-sharing ability of the distributed power system.

DETAILED DESCRIPTION OF THE PREFERRED EMBODIMENTS

Figure 2:
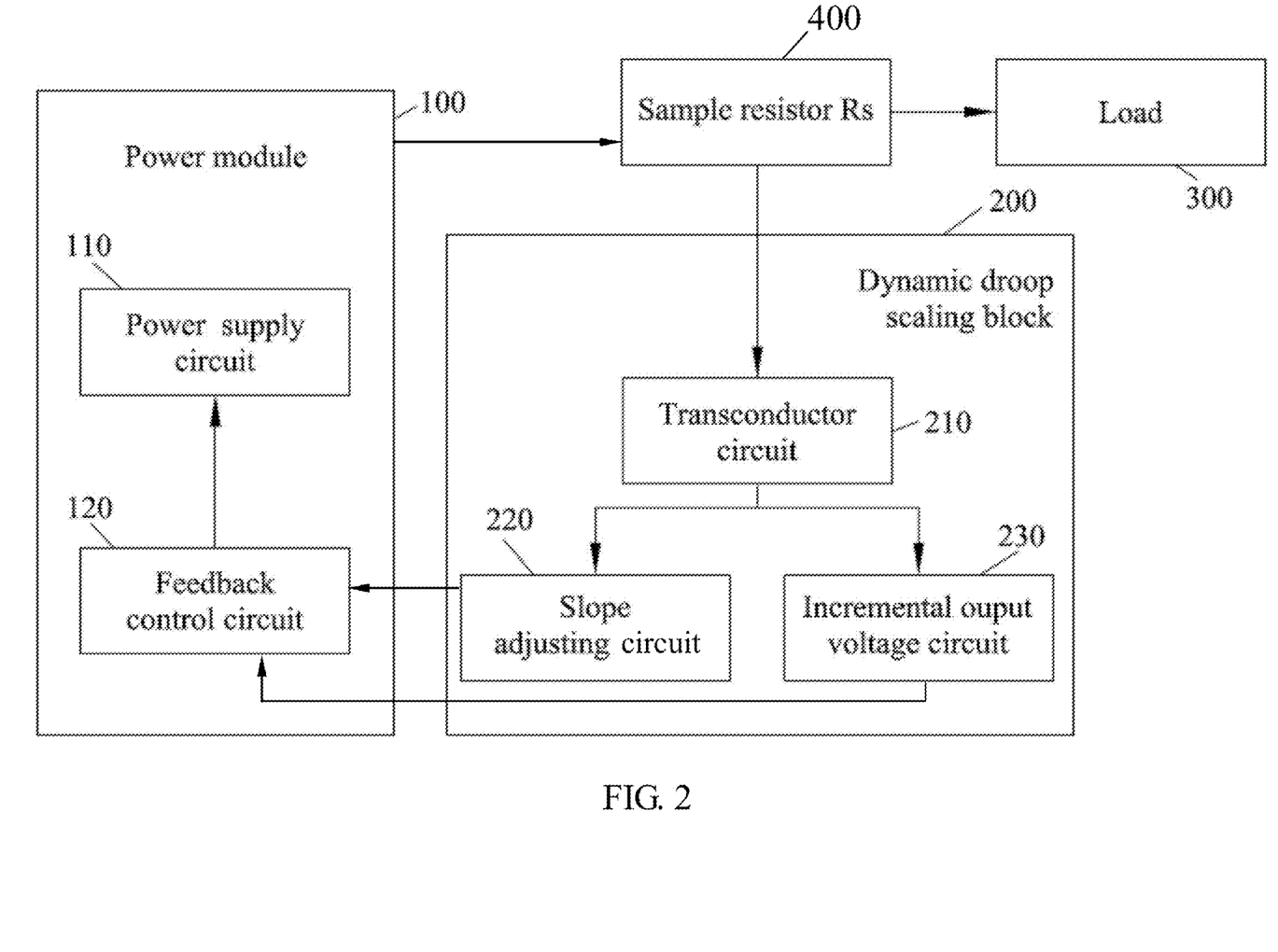
FIG. 2 is the functional block diagram of the slope control device capable of predicting uniform-current-sharing level of the present invention.

Please refer to FIG. 2 for the functional block diagram of the slope control device capable of predicting uniform-current-sharing level in accordance with the present invention, the power module 100 comprises a power supply circuit 110 and a feedback control circuit 120. The power module 100 is connected with the load 300 through a sample resistor Rs 400. The dynamic droop scaling block 200 comprises a high linearity transconductor circuit 210, a slope adjusting circuit 220 and an incremental output voltage circuit 230. The power supply circuit 110 provides an output voltage and an output current to the load 300 based on the signal from the feedback control circuit 120. Meanwhile, the transconductor circuit 210 of the dynamic droop scaling block 200 detects and samples the output current. Then the sampled result is sent to the slope adjusting circuit 220 and the incremental output voltage circuit 230 respectively. The purpose of the slope adjusting circuit 220 is for increasing the droop gain based on the slope of the load regulation characteristic of the parallel connected modules 100. The incremental output voltage circuit 230 is for pulling up the output voltage step by step to ensure that the output voltage is still located under the output voltage variation specification.

Figure 3:
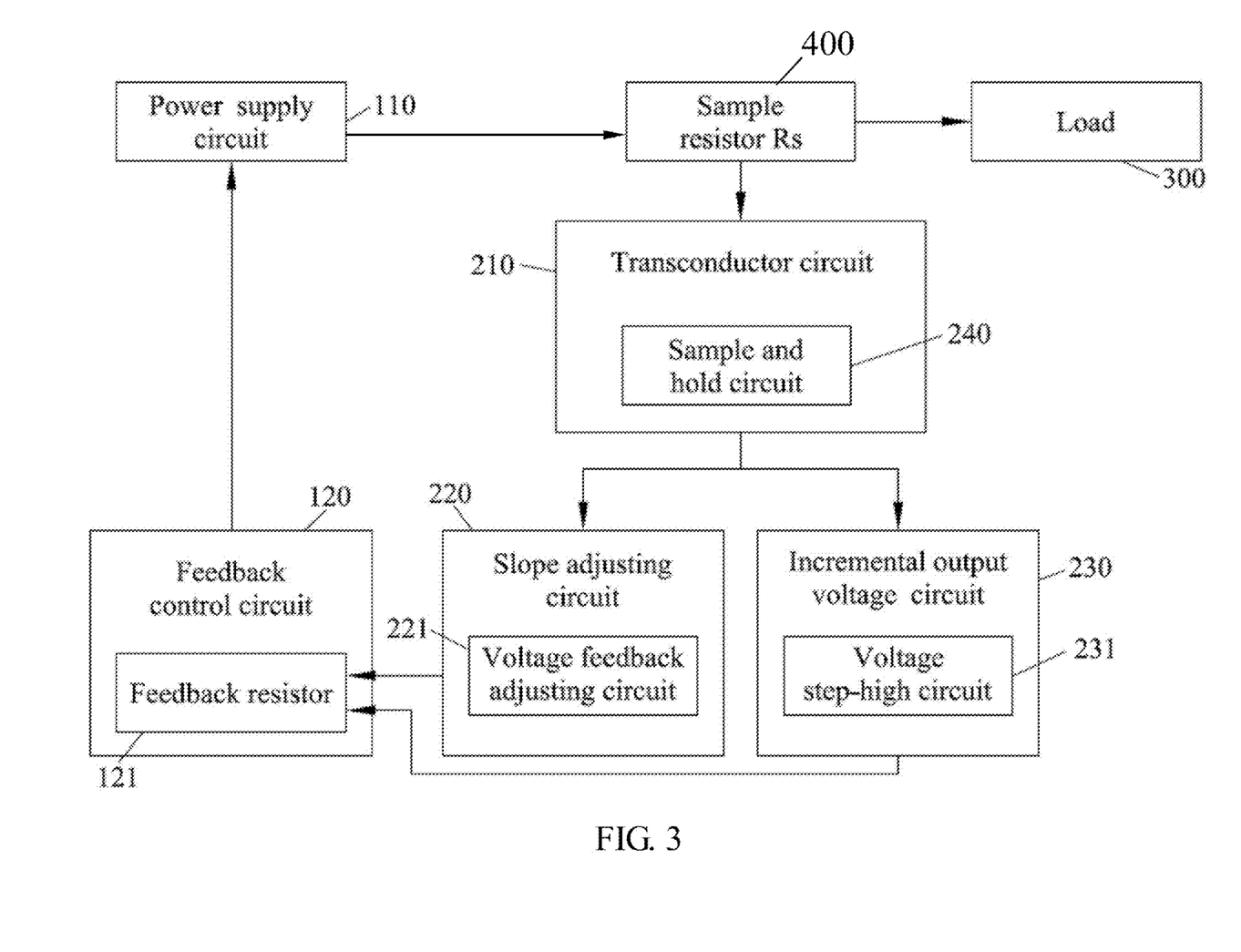
FIG. 3 is the detailed functional block diagram of the slope control device capable of predicting uniform-current-sharing level of the present invention.

FIG. 3 illustrates a detailed functional block diagram of the slope control device capable of predicting uniform-current-sharing level of the present invention. As mentioned above, the transconductor circuit 210 comprises a sample and hold circuit 240. The sample and hold circuit 240 is used for duplicating the detected current from the transconductor circuit 210, and providing the currents to the slope adjusting circuit 220 and the incremental output voltage circuit 230 respectively. The slope adjusting circuit 220 applies a voltage feedback adjusting circuit 221 to multiply the detection current by various parameters and feeds the multiplied current to the feedback control circuit 120. Besides, the feedback resistor 121 of the feedback control circuit 120 can also be adjusted for raising the output voltage-current slope of the power module 100.

While the modified slope is generated instead of the original one, the voltage variation of the power module 100 will exceed the allowable minimum output value at rated current load. Therefore the voltage step-high circuit 231 is triggered to pull up the output voltage when the output voltage reaches the minimum voltage margin of the system, in order to make sure that the output voltage will not exceed the allowable minimum value for all load conditions.

Figure 4:
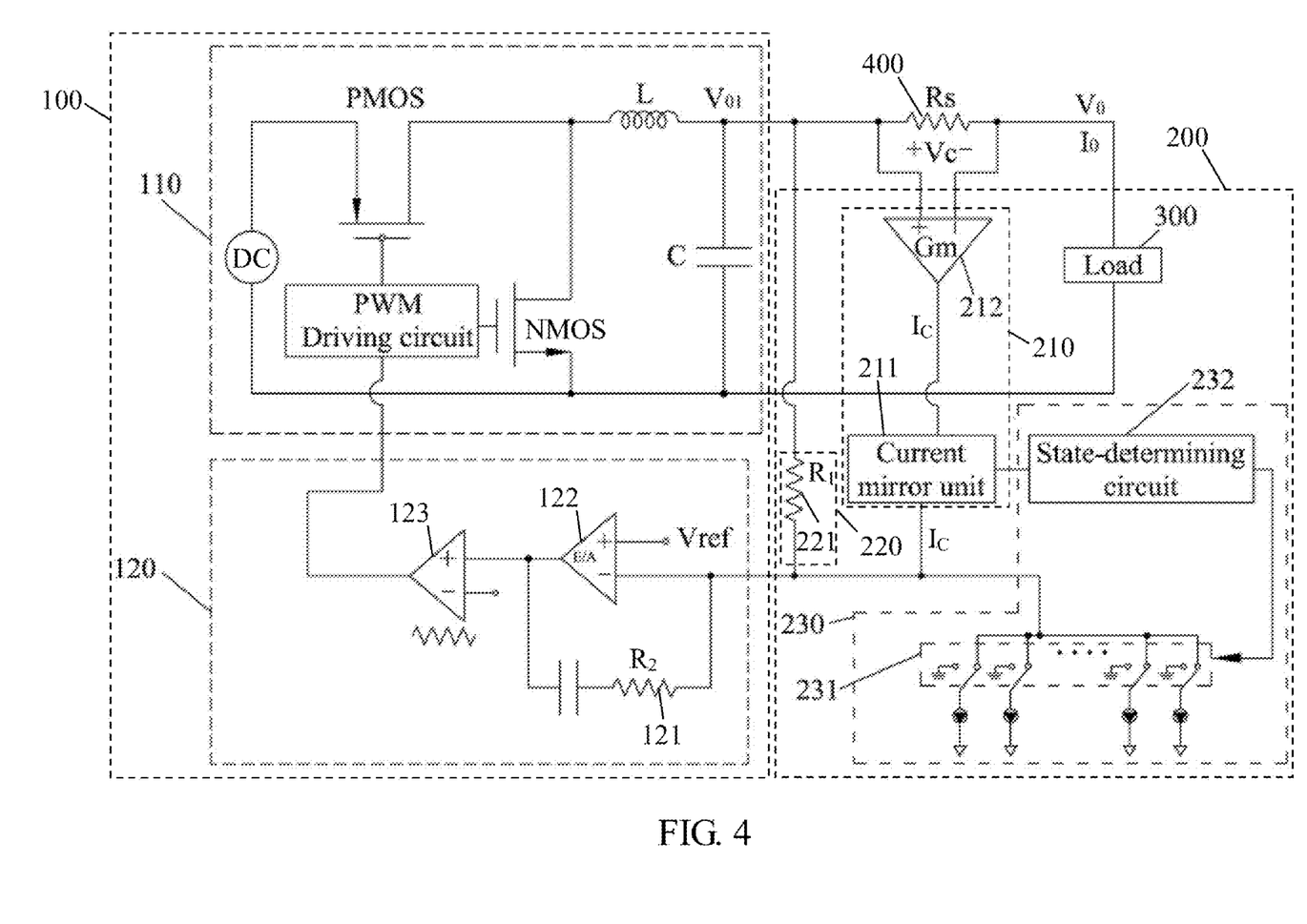
FIG. 4 is the circuit sketch diagram of the embodiment of the slope control device capable of predicting uniform-current-sharing level of the present invention.

FIG. 4 illustrates a circuit diagram of the embodiment of the slope control device capable of predicting uniform-current-sharing level in accordance with the present invention. In the embodiment, the power supply circuit 110 and the feedback control circuit 120 are familiar for those who work in the field, thus the detailed operating principle will not be elaborated herein. In the embodiment, the power supply circuit 110 is a DC to DC voltage switching regulator which is composed of a PWM driving circuit, a PMOS, an NMOS, an inductor L, and a capacitor C. The PWM driving circuit controls the on and off of the PMOS and the NMOS according to the output of the OP-AMP 123 to thereby control the amplitude of the output voltage. And the indicator L and the capacitor C form a filter loop to stabilizing the output voltage. A power transistor is applied in the output terminal of the power supply circuit 110 for preventing the individual power supply circuit 110 from burning out because of short circuits.

In FIG. 4, a power transistor is added in the output terminal of each power supply circuit 110. The equivalent on-resistance of the power transistor can serve as the sample resistor Rs 400. Each power supply circuit 110 is connected to the common output terminal Vo via the sample resistor Rs 400 for supplying the output current to the load 300. In the embodiment, a current mirror unit 211 is followed by a transconductor 212, and together form a transconductor circuit 210. The transconductor 212 detects the voltage Vc across the sample resistor Rs 400. The voltage Vc is given by multiplying the output current Io by the sample resistor Rs 400. The output current Io is provided to the transconductor 212 and mirrored by the current mirror unit 211 to form the detection current Ic. The detection current Ic of the transconductor 212 is then sent to the feedback resistor R1, which is the voltage feedback adjusting circuit 221 in the embodiment, and is flowed through resistor R1 to generate a voltage drop $\Delta Vd$.

Suppose the amplifier is ideal, the voltage gain is infinite. Therefore the negative terminal of the error amplifier 122 is close to the value of Vref. If the power supply circuit 110 operates at no load condition, the value of the common output terminal Vo follows the maximum reference voltage of each power module 100 in this case. For instance, Vo1 is the maximum output voltage of power module 100 at no load, thus the output voltage Vo is equal to Vo1.

While the output current Io is increasing, the detection voltage Vc generated by passing the output current Io through the sample resistor Rs 400 is also increased. And therefore the detection current Ic of the transconductor circuit 210 is also increased. Because the negative terminal of the error amplifier 122 is close to the value of Vref, the current generated by the transconductor circuit 210 flows through the resistor R1 to generate a voltage drop, which is equal to $\Delta$ Vd. The total voltage drop due to the increment of load current is the sum of Vc and $\Delta$ Vd.

Based on the equivalence circuit model, the relationship of the output voltage Vo and the output current Io can be described as:

$$Vo + Io \times Rs \times (1 + gm \times R1) = Vref \quad (1)$$

If an amplify parameter Ka is equals to $Rs \times (1+gm \times R1)$ or $Rs \times (1+Ca)$, then the equation (1) can be simplified into:

$$Vo = Vref - Io \times Ka = Vref - Io \times Rs \times (1+gm \times R1) \quad (2)$$

The relationship of the output voltage Vo and the output current Io of the traditional droop method is as following:

$$Vo + Io \times Rs = Vref \quad (3)$$

The equation mentioned above can be easily derived by masking the detection module 200 from FIG. 4 and using the equivalent circuit model. Therefore, the detailed operating principle will not be elaborate herein.

Comparing equation (2) with equation (3), we can easily understand that the modified slope Mo' is (1+Ca) time larger than the original slope by applying the slope control device in accordance with the present invention. Therefore, the difference between the output currents of the power modules 100 can be minimized (1+Ca) time than the prior art. The reason is simply described herein:

The difference between the output current Io1 of power module 1 and Io2 of power module 2 in the prior art is given as following:

$$Vo1 = Vref - Io1 \times Rs$$

$$Vo2 = Vref - Io2 \times Rs$$

$$\Delta Vo = Vo1 - Vo2 = \Delta Io \times Rs$$

And the difference between the output currents Io1 and Io2 of the present invention is giving as following:

$$Vo1 = Vref - Io1 \times Rs \times (1+gm \times R1)$$

$$Vo2 = Vref - Io2 \times Rs \times (1+gm \times R1)$$

$$\Delta Vo = Vo1 - Vo2 = \Delta Io \times Rs \times (1+gm \times R1)$$

The result of the calculation mentioned above can be described as:

$$\Delta Io(max) = \Delta Vo(max)/Ka \quad (4)$$

Wherein, the $\Delta Vo(max)$ represents the maximum output voltage variation of each power module 100 for all load conditions.

Figure 5:
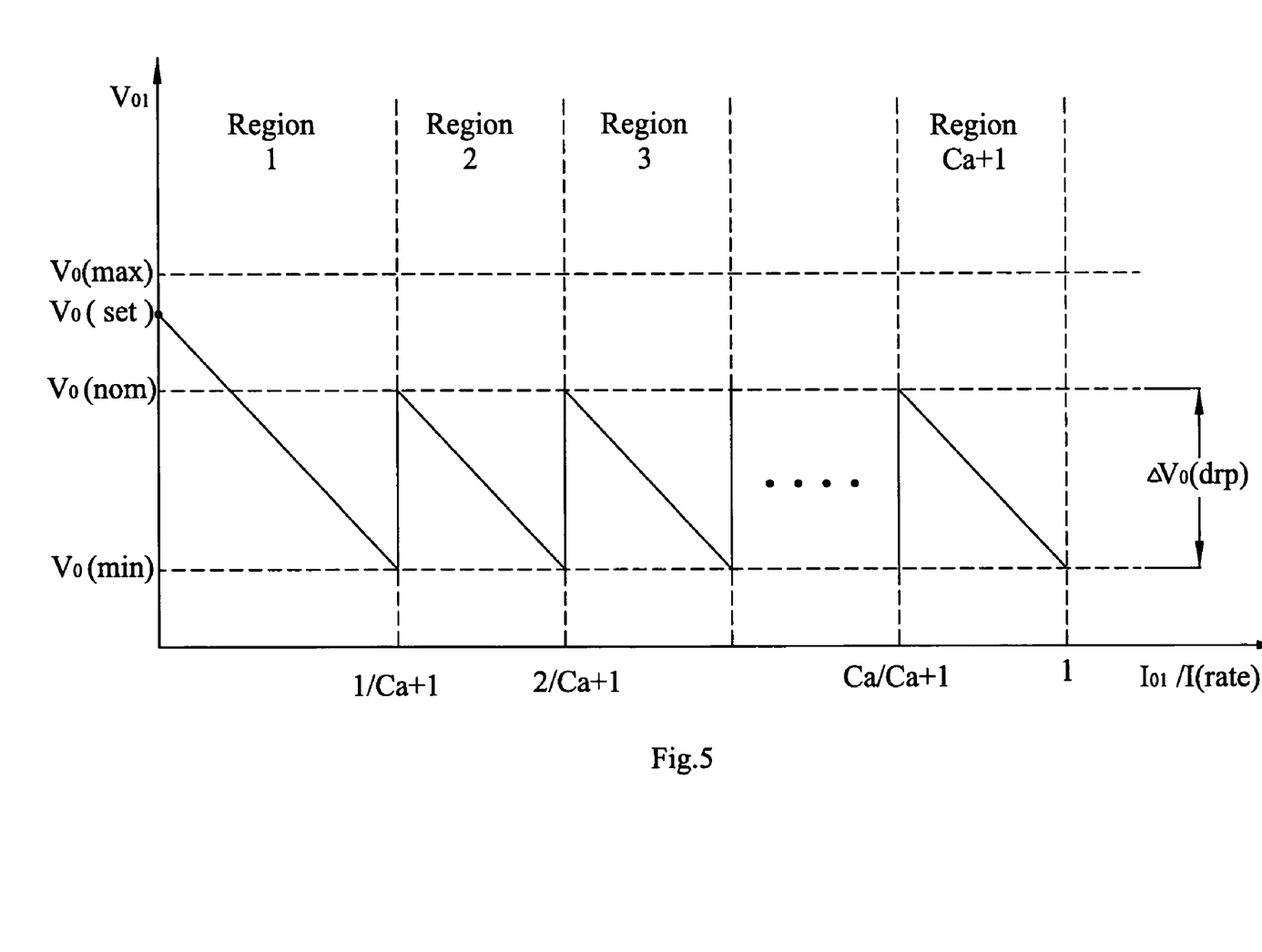
FIG. 5 is the sketch map of the output voltage and the output current of the embodiment of the slope control device capable of predicting uniform-current-sharing level of the present invention.

FIG. 5 illustrates the schematic diagram of the output voltage and the output current of the embodiment of the slope control device capable of predicting uniform-current-sharing level in accordance with the present invention. The operating condition and theory mentioned above can be recognized in the region 1 of FIG. 5. Meanwhile, owing to the larger value of droop slope Ka that equals to $Rs \times (1+Ca)$, the error percentage of current-sharing performance is reduced by a factor (1+Ca). However, due to the steeper value of the modified slope, the voltage variation will exceed the allowable minimum output value Vo(min) at Io(rate)/(Ca+1) and reach (Ca+1) times that of the original droop method. Therefore, within the range of minimum allowable output voltage and maximum allowable rated current, the incremental output voltage circuit is needed to raise the output voltage for every Io(rate)/(Ca+1).

As illustrated in FIG. 4, the incremental output voltage circuit of the embodiment comprises a voltage step-high circuit 231 and a state-determining circuit 232. The voltage step-high circuit 231 can be implemented by a set of current mirror circuit array. As the state-determining circuit 232 is triggered, the switches of the current mirror circuit array were opened one by one, and the total current flowed through R1 was increased step by step. When the output voltage Vo reaches the minimum output voltage value Vo(min), the state-determining circuit 232 is triggered and hence the output current from the current mirror circuit array is added up. As a result, the output voltage Vo is raised step by step for every multiple of Io(rate)/(Ca+1). In this way, the output voltage will not exceed the allowable minimum output voltage for all load conditions.

In the other viewpoint, the curve of the output voltage Vo forms several transition points as the output current Io is increasing with the modified slope Mo'. As illustrated in FIG. 5, the transition points are located at the 1/(Ca+1), 2/(Ca+1), ... and Ca/(Ca+1) time of the rated output current Io(rate). The transition points also mean the suitable time that the voltage step-high circuit should be triggered. To sum up, the relationship between load current and output voltage is given as equation (5):

$$Vo = Vref + \sum_{Ca=1}^{N} Vo(drp) - Io \cdot Ca \quad (5)$$

There are (Ca+1) regions in FIG. 5, and the output voltage is raised about $\Delta$ Vo(drp) for every Io(rate)/(Ca+1).

As seen in FIG. 5, Vo(nom) is the nominal output voltage of the power module 100, and Vo(max) and Vo(min) represent the maximum and minimum output voltage allowed for the system respectively. Io(rate) is the rated output current of the power module 100, and $\Delta$Vo(drp) is the output dropout voltage from no load, Io=0A, to full load, Io=Io(rate).

In conclusion, there is trade-off between error percentage of current sharing and output voltage variation in droop method. However, the slope control device capable of predicting uniform-current-sharing level of the present invention can solve the drawback of the poor uniform-current-sharing ability of the prior.

Figure 6:
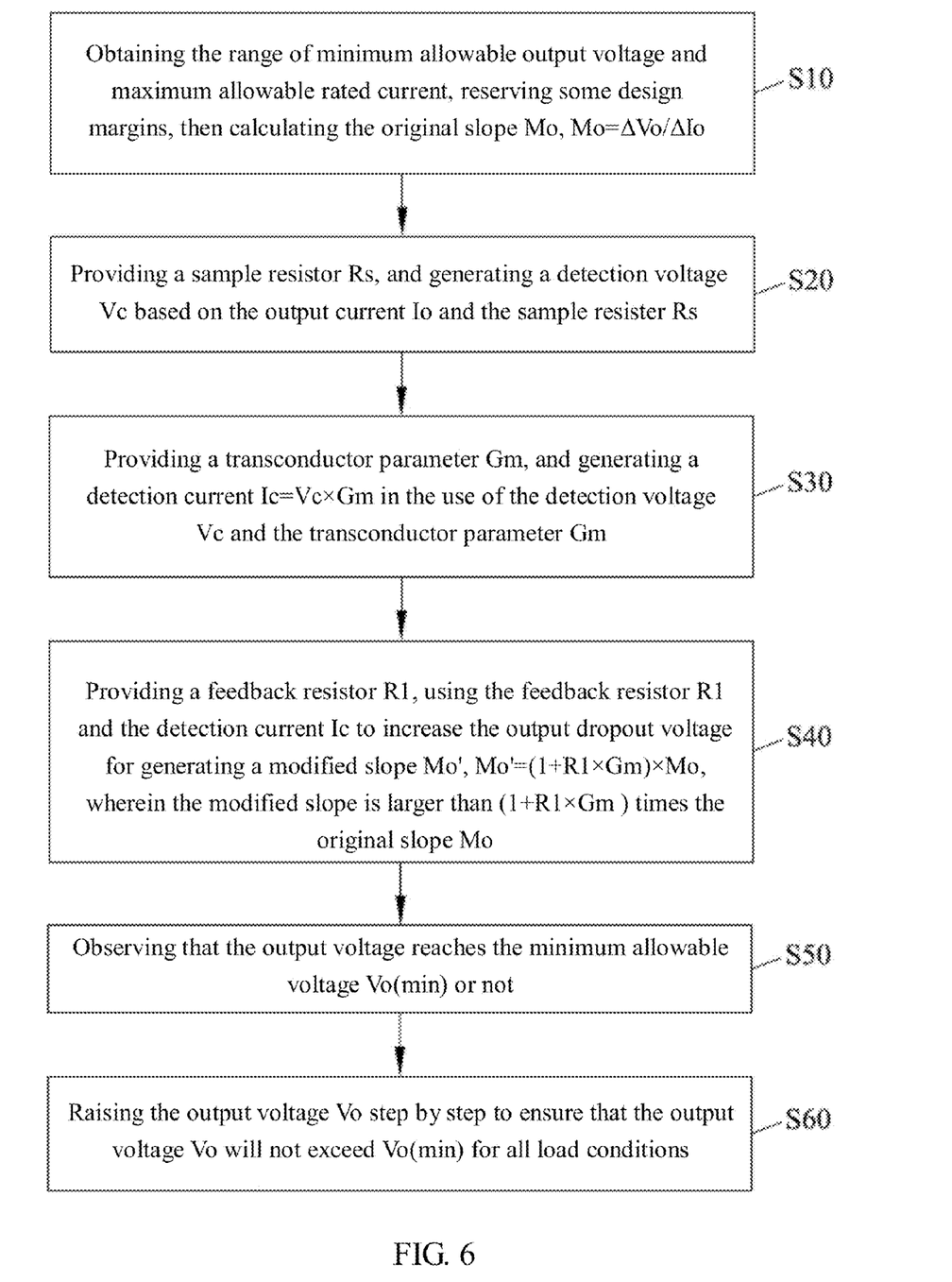
FIG. 6 is the flow map of the slope control method capable of predicting uniform-current-sharing level of the present invention.

Please refer to FIG. 6 for a flow diagram of the slope control method capable of predicting uniform-current-sharing level of the present invention. The method includes the following steps of:

step S10: obtaining the range of minimum allowable output voltage and maximum allowable rated current, reserving some design margins, then calculating the original slope Mo, $Mo = \Delta Vo/\Delta Io$.

step S20: providing a sample resistor Rs, and generating a detection voltage Vc based on the output current Io and the sample resister Rs.

step S30: providing a transconductor parameter Gm, and generating a detection current Ic=Vc×Gm in the use of the detection voltage Vc and the transconductor parameter Gm.

step S40: providing a feedback resistor R1, using the feedback resistor R1 and the detection current Ic to increase the output dropout voltage for generating a modified slope Mo', Mo'=(1+R1×Gm)×Mo, wherein the modified slope is larger than (1+R1×Gm) times the original slope Mo.

step S50: observing that the output voltage reaches the minimum allowable voltage Vo(min) or not.

step S60: raising the output voltage Vo step by step to ensure that the output voltage Vo will not exceed Vo(min) for all load conditions.

Besides, the variations of Rs values for different modules can be compensated by the term of GmR1. We do not need to put much effort on the selection of external components for whole multiple-supplies system.

In the embodiment of the slope control method capable of predicting uniform-current-sharing level of the present invention, a modified slope which is Ca times larger than the original slope is provided. Therefore, the error percentage of current-sharing performance is reduced by a factor (1+Ca).

Figure 7:
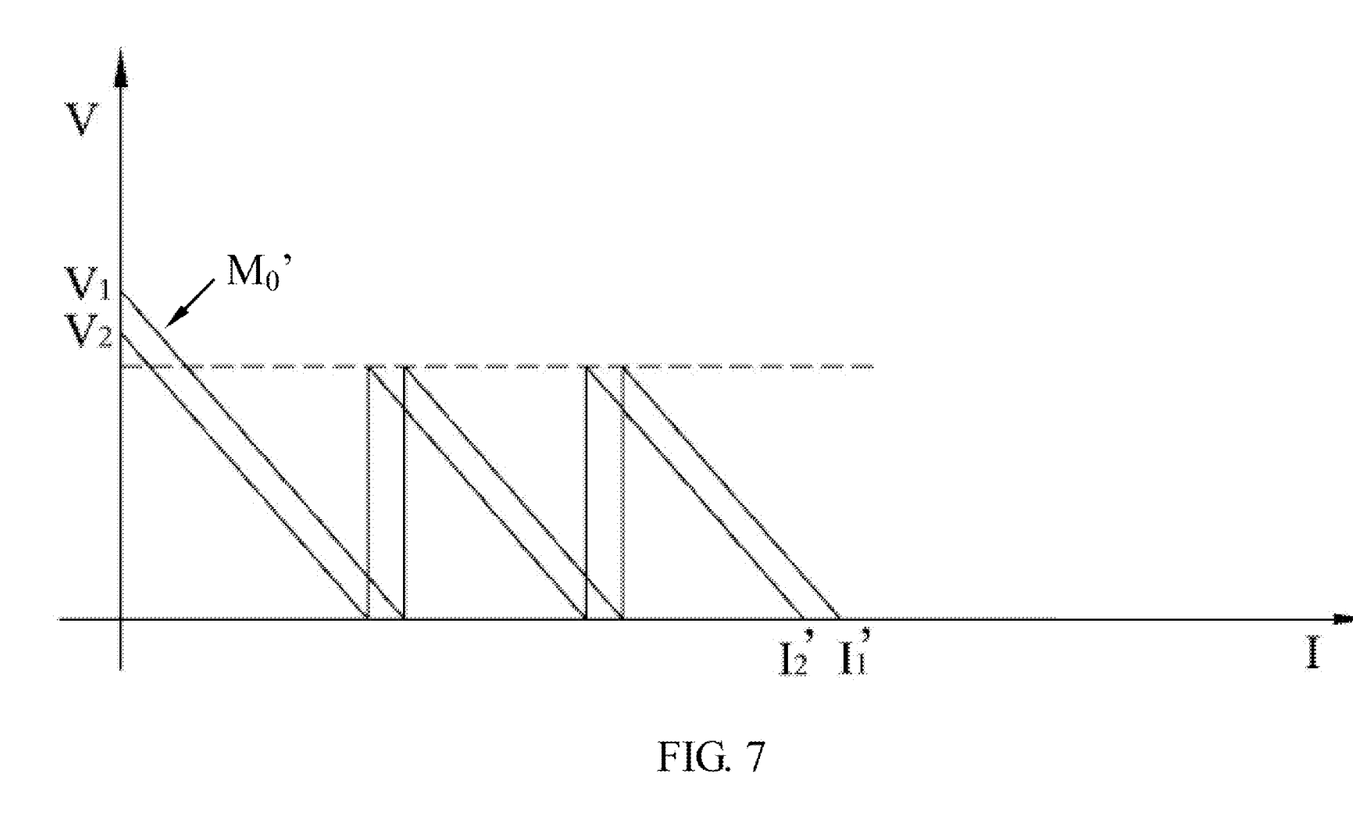
FIG. 7 is the sketch map of the output voltage and the output current of the embodiment of the slope control method capable of predicting uniform-current-sharing level of the present invention.

FIG. 7 illustrates a schematic diagram of the output voltage and the output current of the embodiment of the slope control method capable of predicting uniform-current-sharing level in accordance with the present invention. The modified slope of the present invention is much sharper than the prior art, and the deviation of output currents $I_1'$ and $I_2'$ are smaller between two power supply modules. As a result, the uniform-current-sharing ability of the present invention is enhanced greatly than prior art.

What is claimed is:

1. A slope control device capable of predicting uniform-current-sharing level, for a power module applying with a droop method, and said power module having an original output voltage-current slope, and comprising a sample resistor, and said slope control device comprising:

a transconductor circuit, for generating a detection current based on a detection voltage on said sample resistor while said output current of said power module passing said sample resistor, and for outputting the information of said detection current;

a slope adjusting circuit, for adjusting said original slope into a modified slope based on said information of said detection current; and an incremental output voltage circuit; wherein while said output current is lower than said preset current value and said output voltage decreases to an output voltage minimum value due to the increasing of said output current and said modified slope, said incremental output voltage circuit pulls up said output voltage based on said information to ensure that said output current is increased to approximate a preset current value.

2. The slope control device of claim 1, wherein said transconductor circuit comprises a transconductor.

3. The slope control device of claim 1, wherein said transconductor circuit further comprises a sample and hold circuit for sampling said detection current and generating said information.

4. The slope control device of claim 3, wherein said sample and hold circuit is a current mirror.

5. The slope control device of claim 1, wherein said slope adjusting circuit comprises a feedback resistor.

6. The slope control device of claim 1, wherein said incremental output voltage circuit is a voltage step-high circuit.

7. The slope control device of claim 1, wherein the value of said modified slope is larger than the value of said original slope, and the sign of said modified slope is equal to the sign of said original slope.

8. A slope control method capable of predicting uniform-current-sharing level, for reducing the current difference between a plurality of output currents of a plurality of power modules applying the droop method, and said slope control method including:

obtaining the range of minimum allowable output voltage and maximum allowable rated current, reserving some design margins, then calculating the original slope;

providing a sample register, and generating a detection voltage based on the output current and said sample resister;

providing a transconductor parameter, and generating a detection current based on said detection voltage and said transconductor parameter;

providing a feedback resistor, using said feedback resistor and said detection current to increase the output dropout voltage for generating a modified slope;

observing that the output voltage reaches said minimum allowable voltage or not; and raising said output voltage step by step to ensure that said output voltage will not exceed said minimum allowable voltage for all load conditions.

9. The slope control method of claim 8, further including a step of using said transconductor parameter and said feedback resistor to compensate said modified slope for unifying said plurality of power modules to make sure the values of the slopes of said plurality of power modules are equal to each other.

10. The slope control method of claim 8, further including a step of using said feedback resistor and said transconductor parameter for making said modified slope larger than said original slope a multiple parameter time, so as to reduce said current difference of said plurality of output currents said multiple parameter time.

11. The slope control method of claim 10, wherein the curve of said output voltage and said output current comprises a plurality of regions, and the number of said regions is direct proportion to said multiple parameter.

12. The slope control method of claim 8, wherein said power modules are applied in a redundancy or distributed power system, and said power system is for supplying a preset load current to a load, and said preset current value is the average value of dividing said preset load current by the number of said power modules.

13. The slope control method of claim 8, wherein the value of said modified slope is larger than the value of said original slope, and the sign of said modified slope is equal to the sign of said original slope.

* * * * *